United States Patent Office 2,982,611
Patented May 2, 1961

2,982,611
PRODUCTION OF ALKALI METAL PHOSPHATES

Alban J. Lobdell, Kirkwood, Mo., assignor to Monsanto Chemical Company, St. Louis, Mo., a corporation of Delaware No Drawing. Filed Dec. 23, 1957, Ser. No. 704,289

4 Claims. (Cl. 23—106)

This invention relates to the production of alkali metal phosphates. More particularly, this invention relates to the production of alkali metal phosphates by reaction between a phosphoric acid and alkali metal halide. A particularly preferred aspect of the present invention deals with the production of the more highly alkaline alkali metal phosphates containing only very small proportions of residual halide impurities therein. A further preferred embodiment relates to the foregoing process carried out under conditions such that hydrogen chloride is recovered in economically attactive concentations.

By far the most prevalent of the alkali metal phosphates produced commercially at the present time are the various sodium phosphates—and most of these sodium phosphates are produced from phosphoric acid and soda ash. Since soda ash is produced from the much less expensive raw materials, sodium chloride, many investigators have in the past spent a great deal of time attempting to develop a process for producing sodium phosphates directly from sodium chloride and phosphorus or phosphoric acid—thereby avoiding the more expensive intermediate conversion of sodium chloride to soda ash. An example of such an attempt is the one described in the Kerschbaum patents, U.S. 2,142,943 and U.S. 2,142,944, which involve burning elemental phosphorus with oxygen or air to form phosphorus pentoxide, simultaneously mixing the phosphorus pentoxide with water vapor and reacting with molten sodium chloride, thereby forming molten sodium phosphate salts and gaseous hydrogen chloride. A typical example of such a process can be represented by the following equation:

(Eq. 1)

$$12P + 15O_2 + 10H_2O + 20NaCl \rightarrow 4Na_5P_3O_{10} + 20HCl$$

Another process which has been proposed for making phosphate salts directly from alkali metal halides such as sodium chloride is the direct reaction of phosphoric acid and an alkali metal halide. A typical example of this reaction can be represented as follows:

(Eq. 2)

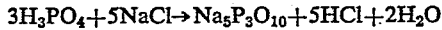
$$3H_3PO_4 + 5NaCl \rightarrow Na_5P_3O_{10} + 5HCl + 2H_2O$$

One of the major difficulties in making phosphates, and particularly the more alkaline phosphates such as sodium tripolyphosphate, tetrasodium pyrophosphate, and trisodium orthophosphate, by either of the foregoing processes is that it is very difficult to eliminate the residual amounts of alkali metal halide reactants left as impurities in the final phosphate product. One way in which this difficulty has been overcome in the first of the above-indicated processes is by the use of a large excess of water, which (as would be expected from the fact that water is one of the reactants in that process) tends to drive the reaction toward completion and thereby reduce the residual concentration of alkali metal halide. However, in contrast to the process represented by Equation 1 (in which water is a reactant), the reaction indicated by Equation 2 (in which water is a product) would not be expected to be driven further toward completion by an excess of water. On the contrary, it would be expected that the presence of an excess of water in the reaction of Equation 2 would prevent that reaction from proceeding as desired—thereby resulting in an even larger than usual amount of residual halide contamination.

I have now found however, that contrary to expectation the reaction between a phosphoric acid and an alkali metal halide can be completed much more readily and with a consequent substantial reduction of residual alkali metal halide content by contacting the reaction mixture with water (in excess of that amount produced by the reaction), preferably in the form of water vapor, or steam. This excess of water can be utilized simultaneously with the reaction between the phosphoric acid and the alkali metal halide, but it is preferably introduced and reacted with the reaction product resulting from the prior reaction between the phosphoric acid and the alkali metal halide. The reaction between the water and the reaction product of acid and halide is preferably carried out by passing the water as a vapor, either alone or in the additional presence of other gases (such as combustion gases of methane or other combustible fuels), over or through the molten intermediate reaction product (i.e., the reaction product of phosphoric acid and alkali metal halide) on a continuous, steady state basis.

The remarkable results obtained by the practice of the present invention are illustrated by the following example:

Example

Finely ground sodium chloride (0.795 pound) was mixed with 0.940 pound of 85% orthophosphoric acid and heated at atmospheric pressure to a temperature of about 800° C. At this point the reaction had proceeded to a sodium phosphate product containing about 10.6% residual sodium chloride. Further contacting the melt at 1050° C. with the products of combustion of 0.0456 pound of methane in a 20% excess of air containing 0.40 pound of steam resulted in 99.9% conversion of the sodium chloride and orthophosphoric acid to sodium tripolyphosphate containing only 0.1% of residual sodium chloride.

While the foregoing example is directed to the specific illustration of production of tripolyphosphate, the technique described is substantially equally applicable to other alkali metal salts (e.g., the potassium, lithium, etc. salts) as well as to those salts of other phosphates, either more alkaline (such as pyrophosphates and orthophosphates) or less alkaline (such as the various "glassy" phosphates). The invention is most useful in the production of alkali metal phosphates containing a molar ratio of $M_2O/P_2O_5$ between about 1.4 and about 3.0, wherein M represents any alkali metal. The invention is particularly preferred for the production of such phosphates containing a molar ratio of $M_2O/P_2O_5$ between about 1.6 and about 2.0.

The proportion of alkali metal halide and phosphoric acid reactants should be selected so as to have the same atomic ratio of alkali metal to phosphorus as the molar ratio of $M_2O$ and $P_2O_5$ in the desired phosphate product. For example, to produce sodium tripolyphosphate (molar ratio of $Na_2O/P_2O_5$ equal to 1.67) from NaCl and $H_3PO_4$, the molar ratio of reactants would also be 1.67. To produce tetrapotassium pyrophosphate (molar ratio of $K_2O/P_2O_5$ equal to 2) from KCl and $H_3PO_4$, the molar ratio of reactants would also be 2. To produce sodium tripolyphosphate from NaCl and $H_4P_2O_7$, the molar ratio of these reactants should be 3.33.

The amount of water to be used in reducing the alkali metal halide content of alkali metal phosphates produced according to the present invention will depend upon the desired degree of halide removal and upon the efficiency of contact between the water and the halide/phosphoric acid reaction product. For example, much larger quantities of water will be required to reduce the alkali metal halide content to 0.1% than will be required to reduce the halide content to 1.0%. On the other hand, much smaller amounts will suffice with very efficient contacting (e.g., as by bubbling steam through the reaction mass) than with inefficient contacting (as by merely passing steam over the surface of the reaction mass). The determination of the precise amount of water required under any particular set of circumstances is well within the capabilities of one normally skilled in the art. As a minimum, the amount of water required will always be an amount equal (on a molar basis) to one-half the amount of halide to be removed. As a practical matter, however, the actual amount of water needed will be somewhat in excess of the foregoing minimum—depending upon the particular level of halide concentration in the molten reaction mass. For example, in a melt containing 10 wt. percent of chloride ion, the amount of water used will approach the foregoing minimum; in a melt containing only 0.1 wt. percent of chloride ion, the amount of water used may be as much as a hundred or more times that minimum.

The temperature at which the phosphoric acid/metal halide reaction products are treated with water according to the present invention will depend to some extent upon the particular phosphate compositions being produced—but will always be above the melting point of the composition. Thus, for a phosphate composition having an $Na_2O/P_2O_5$ molar ratio of 1.4, the process will be carried out at a temperature of at least about 600° C. For a tripolyphosphate composition ($Na_2O/P_2O_5$ molar ratio of 1.67), the temperature will be at least about 880° C. Although the reduction in halide concentration proceeds more readily as the temperature is increased, it will be readily recognized that the use of extremely high temperatures gives rise to practical difficulties with respect to factors such as materials of construction. Consequently, the present invention is preferably carried out at temperatures below about 1200° C., particularly for the sodium phosphates.

It should be pointed out that the water utilized to reduce the halide content according to the present invention should be substantially free from $P_2O_5$. If $P_2O_5$ is present in or with such water, there is a strong tendency for the $P_2O_5$ to be absorbed by the molten phosphates—thereby decreasing the alkalinity of the phosphate and defeating the objective of obtaining a highly alkaline phosphate.

According to a preferred embodiment of the present invention the hydrogen chloride produced during the process is recovered as a by-product. Under such circumstances it is advantageous, and consequently preferred, to pass the molten reaction product of phosphoric acid and alkali metal halide in countercurrent multi-stage constant relationship with the water vapor in order to decrease water requirements and/or to produce a product gas having a high concentration of HCl and a high ratio of HCl to $H_2O$. For example, by contacting a molten reaction product of 5 mols of sodium chloride with 3 mols of phosphoric acid (but still containing 10.6 wt. percent sodium chloride) with water vapor under conditions equivalent to 3 theoretical (equilibrium) stages, a sodium tripolyphosphate product containing about 0.1 wt. percent sodium chloride can be produced—while at the same time producing a product gas stream containing HCl and $H_2O$ in a volume ratio of about 1:14. Such a gas can be readily absorbed in a cooler-absorber to produce an aqueous hydrochloric acid having a strength as high as about 20%. This latter acid can be further utilized as an absorbent for the gaseous HCl given off by the initial reaction of phosphoric acid and salt, thereby making the production of even stronger acid (e.g., 18° Baumé or higher) economically feasible.

I claim:

1. A process for producing an alkali metal phosphate having a molar ratio of alkali metal oxide to phosphorus pentoxide of at least about 1.4, which process comprises maintaining the molten reaction product of (a) between about 1.4 and about 3 molar proportions of an alkali metal halide and (b) 1 molar proportion of a phosphoric acid at an elevated temperature while contacting said molten reaction product with water, substantially free of $P_2O_5$, to substantially reduce the alkali metal halide content of the resulting alkali metal phosphate, the minimum quantity of water being at least equal (on a molar basis) to one-half the amount of halide to be removed.

2. A process for producing a sodium phosphate having a molar ratio of $Na_2O/P_2O_5$ between about 1.6 and about 2, which comprises maintaining the molten reaction product of (a) between about 1.6 and about 2 molar proportions of sodium chloride and (b) 1 molar proportion of orthophosphoric acid at a temperature above about 880° C. while contacting said molten reaction product with steam, which is substantially free of $P_2O_5$, to substantially reduce the sodium chloride content of the resulting sodium phosphate, the minimum quantity of water being at least equal (on a molar basis) to one-half the amount of chloride to be removed.

3. A process for producing a sodium phosphate having a molar ratio of $Na_2O/P_2O_5$ between about 1.6 and about 2, which process comprises reacting sodium chloride and orthophosphoric acid in a molar ratio between about 1.6 and about 2, respectively, at a temperature maintained above the melting point of the reaction mixture, and subsequently contacting the molten reaction product with sufficient water vapor at a temperature between about 880° C. and about 1200° C. to reduce the sodium chloride content of the resulting sodium phosphate below about 1% by weight.

4. A process for producing sodium tripolyphosphate substantially free of sodium chloride contamination while simultaneously producing concentrated aqueous hydrochloric acid, which process comprises reacting sodium chloride and orthophosphoric acid in a molar ratio of 5 to 3, respectively, in a first reaction zone at a temperature maintained above the melting point of the reaction mixture, thereby producing an intermediate molten sodium phosphate product having a relatively high chloride content and a gaseous product having a relatively high hydrogen chloride content, passing said intermediate molten sodium phosphate product having a relatively high chloride content through a second reaction zone in countercurrent multi-stage contact with a quantity of water vapor at least equal (on a molar basis) to one-half the amount of halide to be removed, at a temperature between about 880° C. and about 1200° C. to produce sodium tripolyphosphate substantially free of chloride contamination and a gaseous product having a relatively low hydrogen chloride content, contacting said latter gaseous product with liquid water to absorb said hydrogen chloride and form a relatively weak aqueous hydrochloric acid solution, and thereafter contacting said relatively weak aqueous hydrochloric acid solution with the aforesaid gaseous product having a relatively high hydrogen chloride content to form a relatively strong aqueous hydrochloric acid solution.

References Cited in the file of this patent

UNITED STATES PATENTS

| | | |
|---|---|---|
| 1,456,850 | Hazen et al. | May 29, 1923 |
| 1,805,873 | Kaselitz | May 19, 1931 |
| 2,167,757 | Jelen | Aug. 1, 1939 |
| 2,288,418 | Partridge | June 30, 1942 |
| 2,792,284 | Alexander | May 14, 1957 |